United States Patent [19]
Aoi et al.

[11] Patent Number: 5,717,136
[45] Date of Patent: Feb. 10, 1998

[54] HOT FILM TYPE AIR FLOW QUANTITY DETECTING APPARATUS APPLICABLE TO VEHICULAR INTERNAL COMBUSTION ENGINE

[75] Inventors: Hiroshi Aoi; Masao Tsukada, both of Atsugi, Japan

[73] Assignee: Unisia Jecs Corporation, Atsugi, Japan

[21] Appl. No.: 397,039

[22] Filed: Feb. 27, 1995

[30] Foreign Application Priority Data

Feb. 28, 1994 [JP] Japan .................................. 6-54624
Jun. 8, 1994 [JP] Japan ................................. 6-150429

[51] Int. Cl.⁶ ................................................ G01F 1/68
[52] U.S. Cl. ............................................... 73/204.26
[58] Field of Search ..................... 73/204.26, 204.18, 73/118.2, 204.21, 204.19

[56] References Cited

U.S. PATENT DOCUMENTS

| | | | |
|---|---|---|---|
| 4,468,963 | 9/1984 | Schauble | 73/204 |
| 4,649,745 | 3/1987 | Kondo et al. | 73/204 |
| 4,688,424 | 8/1987 | Handtmann et al. | 73/204 |
| 4,736,302 | 4/1988 | Kinugawa et al. | 364/431.05 |
| 4,803,875 | 2/1989 | Kuhn et al. | 73/204.26 |
| 4,821,700 | 4/1989 | Weibler et al. | 73/118.2 |
| 4,841,938 | 6/1989 | Weibler et al. | 73/118.2 |
| 4,986,122 | 1/1991 | Gust | 73/204.26 |
| 5,218,866 | 6/1993 | Phillips et al. | 73/204.15 |
| 5,271,272 | 12/1993 | Hueftle et al. | 73/204.26 |
| 5,303,584 | 4/1994 | Ogasawara et al. | 73/204.21 |
| 5,343,745 | 9/1994 | Tomisawa | 73/204.18 |
| 5,369,994 | 12/1994 | Hecht et al. | 73/204.16 |
| 5,372,040 | 12/1994 | Hecht et al. | 73/204.26 |
| 5,375,466 | 12/1994 | Konzelmann | 73/204.26 |
| 5,396,795 | 3/1995 | Araki | 73/204.26 |

FOREIGN PATENT DOCUMENTS

| | | |
|---|---|---|
| 31 35 793 | 3/1983 | Germany . |
| 41 15 040 | 11/1992 | Germany . |
| 43 24 040 | 1/1994 | Germany . |
| 50-146369 | 11/1975 | Japan . |
| 51-127759 | 8/1976 | Japan . |
| 56-108909 | 8/1981 | Japan . |
| 58-136724 | 9/1983 | Japan . |
| 59-115864 | 8/1984 | Japan . |
| 59-148821 | 8/1984 | Japan . |
| 60-247169 | 12/1985 | Japan . |
| 61-2020 | 1/1986 | Japan . |
| 62-14328 | 1/1987 | Japan . |
| 62-73124 | 4/1987 | Japan . |
| 63-265118 | 11/1988 | Japan . |
| 1-185416 | 7/1989 | Japan . |
| 6-10260 | 3/1994 | Japan . |
| 2 255 642 | 11/1992 | United Kingdom . |

Primary Examiner—Elizabeth L. Dougherty
Assistant Examiner—Jewel V. Artis
Attorney, Agent, or Firm—Foley & Lardner

[57] ABSTRACT

In an apparatus for detecting airflow quantity applicable to a vehicular internal combustion engine, a slit is formed so that an insulating substrate is partitioned into a main substrate portion and a sub substrate portion. A first temperature sensitive resistor, a heat generated main resistor 31, and a second temperature sensitive resistor are formed on the main substrate portion in film forms in the order with respect to the forward air stream direction (A). A difference in the resistance values of the first and second temperature sensitive resistors 32 and 33 detects the air stream direction and detects the flow quantity according to a temperature variation (namely, the variation in resistance value) in the heat generated temperature sensitive main resistor due to the cooling caused by the intake air.

16 Claims, 6 Drawing Sheets

HOT FILM TYPE AIR FLOW QUANTITY DETECTING APPARATUS APPLICABLE TO VEHICULAR INTERNAL COMBUSTION ENGINE

BACKGROUND OF THE INVENTION

1. Field of The Invention

The present invention relates to a hot-film type air flow quantity detecting apparatus applicable to a vehicular internal combustion engine which is suitable to detect an intake air quantity sucked into respective engine cylinders.

2. Description of Background Art

Generally, in a vehicular internal combustion engine, an air-fuel mixture is combusted within each combustion chamber of an engine main body and a revolution output is taken out from its combustion pressure. It is an important factor to detect the intake air quantity when a fuel injection quantity is calculated.

A U.S. Pat. No. 5,343,745 issued on Sep. 6, 1994 exemplifies an intake air flow quantity detecting system.

SUMMARY OF THE INVENTION

It is an object of the present invention to provide an improved air quantity detecting apparatus applicable to a vehicular internal combustion engine which can prevent an erroneous detection of intake air quantity which would be caused by an opposite air stream directed from an exhaust valve to an intake valve at each cylinder of the engine and which can improve a high detection accuracy of the intake air quantity.

The above-described object can be achieved by providing an apparatus comprising: a) an airflow meter main body having a base end and a free end, the base end being attached onto an inner surface of an intake air pipe of a vehicular internal combustion engine; b) a temperature sensitive main resistor which undergoes a heat generation by means of a first external power supply, whose resistance value is varied according to a temperature in a body thereof, and which is so constructed and arranged so as to be exposed to an intake air flowing in the intake air pipe; c) an insulating substrate attached onto the airflow meter main body, the temperature sensitive main resistor being formed and secured on said insulating substrate in a film form and being extended along at least an elongated direction of the insulating substrate; and d) first and second temperature sensitive resisters which are formed on surface portions of the insulating substrate other than the temperature sensitive resistor, whose resistance values are varied according to temperatures in their bodies, and which are spaced apart from each other in an upper stream and downstream direction with respect to a main air stream direction of the intake air flowing into each cylinder of the engine, the first and second temperature sensitive resisters being heated to mutually equal temperatures by means of a second external voltage supply.

BEST MODE CARRYING OUT THE INVENTION

Reference will hereinafter be made to the drawings in order to facilitate a better understanding of the present invention.

FIG. 1 through 4 show a first preferred embodiment of an airflow quantity detecting apparatus according to the present invention.

It is noted that the airflow quantity detecting apparatus serves as a transducer which detects a physical quantity and converts it into a corresponding electrical signal.

Before explaining the first embodiment shown in FIGS. 1 through 4, a problem solved by the present invention will be described below.

Figure 1:
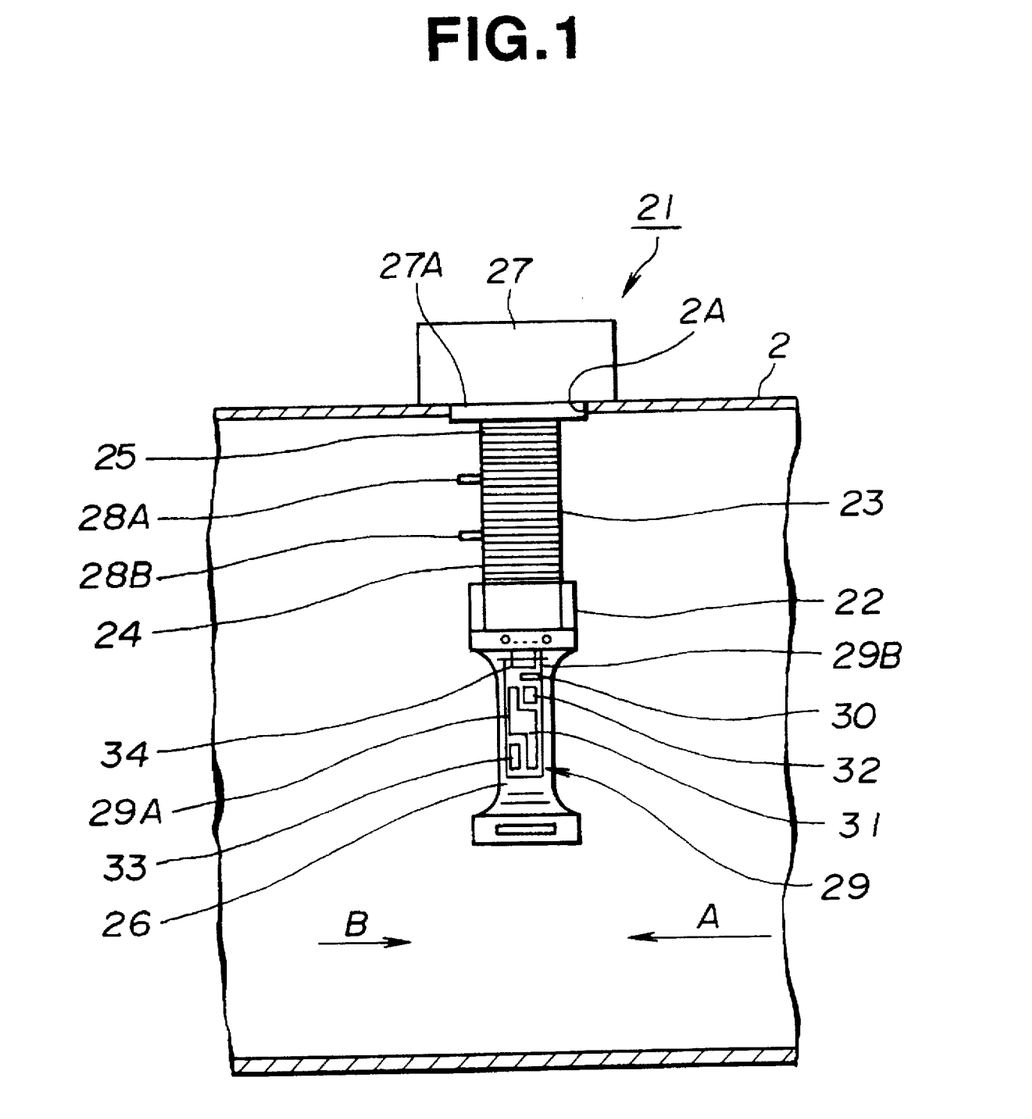
FIG. 1 is a longitudinal cross sectional view of an intake air pipe of a vehicular internal combustion engine on which a hot-film type air quantity detecting apparatus in a first embodiment according to the present invention is attached.
Figure 4A:
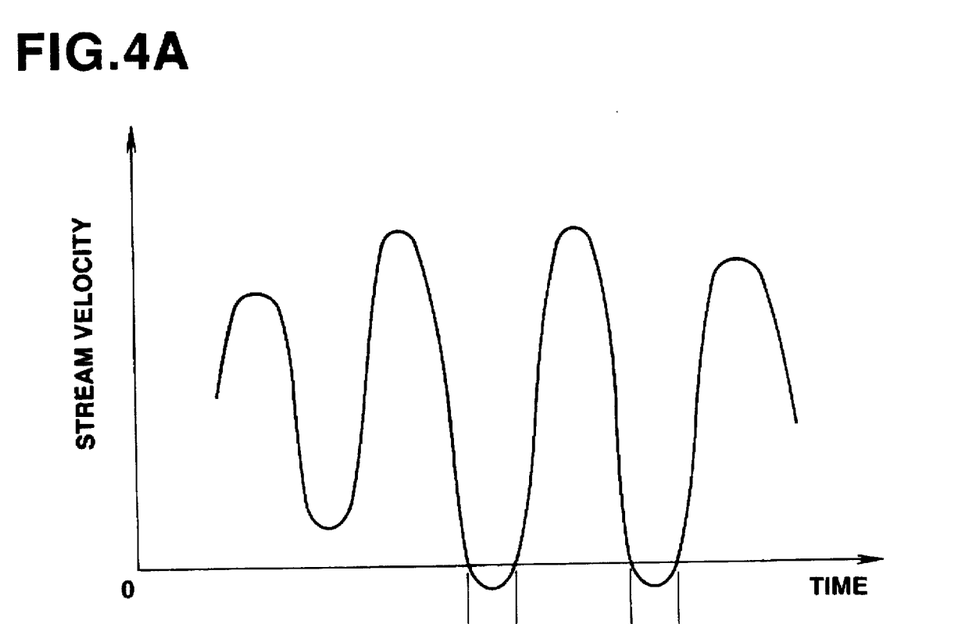
FIGS. 4A and 4B are integrally a characteristic graph representing a relationship between an air stream velocity of the intake air and detection signal of the air stream direction in the first embodiment.

That is to say, in an engine main body having multiple cylinders, whenever each intake valve (not shown) is opened, which is installed on a corresponding one of the engine cylinders, according to a reciprocal motion of a corresponding one of the pistons, the intake air is sucked into the corresponding one of the cylinders in an arrow-marked direction (A shown in FIG. 1, i.e., a forward direction). Therefore, an air stream velocity of air flowing into an intake air pipe (2 shown in FIG. 1) of the engine repeatedly increases and decreases thereof, as shown in FIG. 4A according to the open and closure of each intake air valve, resulting in an air pulsation.

Figure 4B:
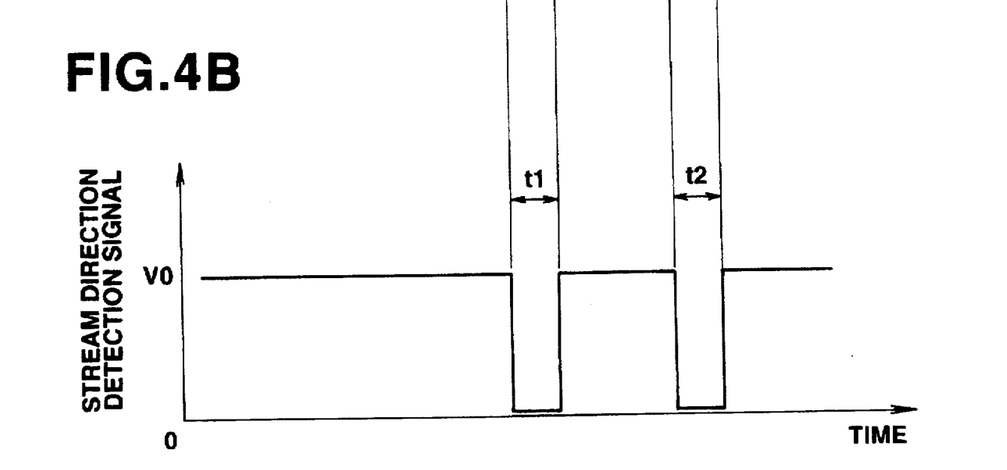

In particular, whenever an engine revolution speed has reached to a middle speed range from a low speed range so that the intake air quantity and exhaust gas quantity are increased, the intake and exhaust valves (not shown) overlap so that a part of the exhaust gas is often expired back to the intake air pipe (2) along with the open of the intake valve(s). At this time, the air stream velocity indicates negative during time intervals $t_1$ and $t_2$ as shown in FIGS. 4A and 4B, so that another air stream flowing in an arrow-marked direction (B shown in FIG. 1, i.e., an opposite direction to the forward direction) is generated. Consequently, an erroneous detection of the intake air quantity might result. The present invention has been based on a discovery described above and has solved the above-described problem.

First Embodiment

Figure 2:
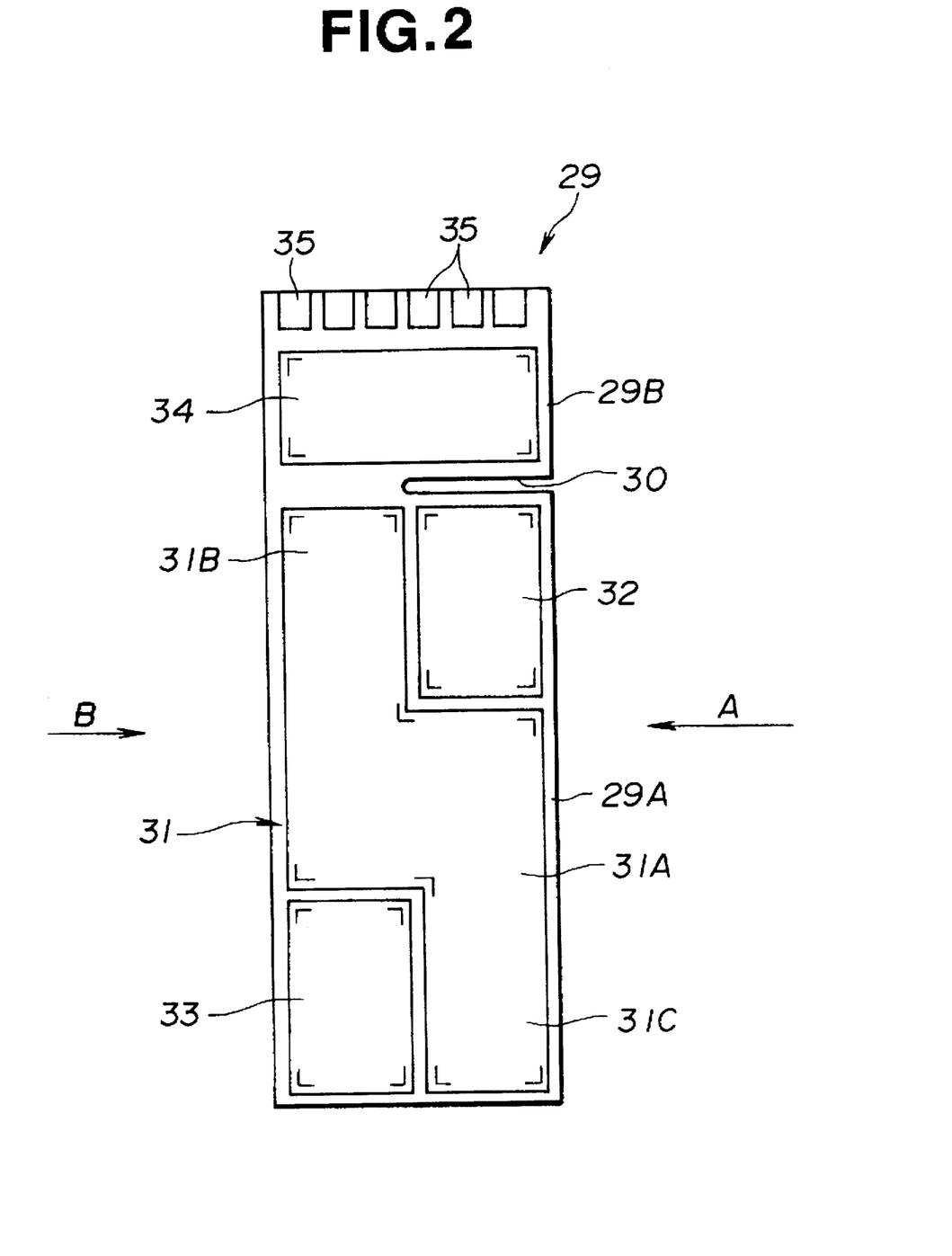
FIG. 2 is a detailed plan view of a heat generating resistor body, first and second temperature sensitive resisters, and auxiliary heater formed on an insulating substrate shown in FIG. 1.
Figure 3:
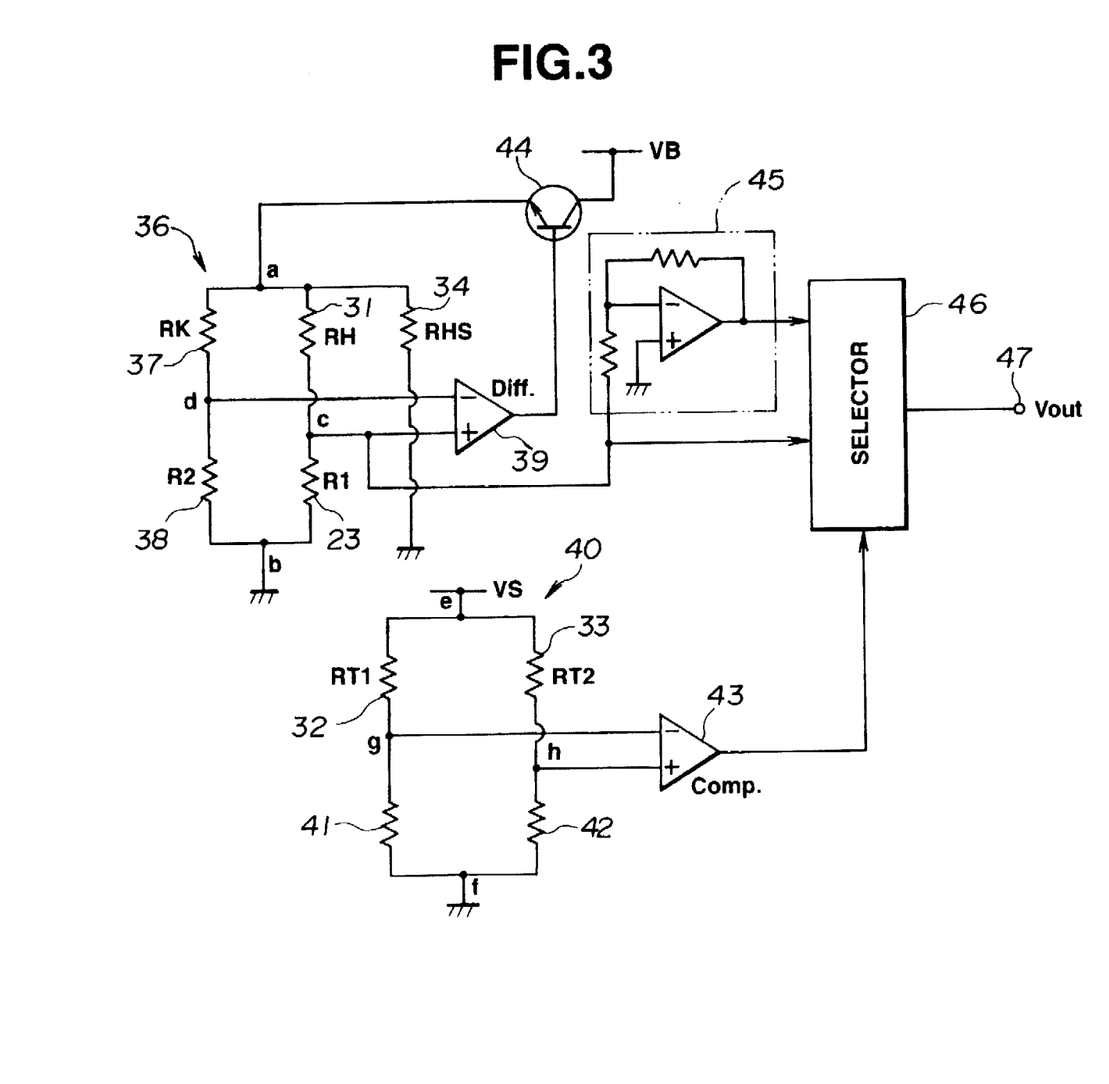
FIG. 3 is a circuit block diagram of the hot-film type air quantity detecting apparatus in the first embodiment.

Referring to FIGS. 1, 2, and 3, the hot-film type intake air quantity detecting apparatus 21 is disposed on a wall of the intake air pipe 2. A main body 22 of the intake air quantity detecting apparatus 21 includes: a wire wound portion 24 on which a reference resistor 23 having a resistance value of R1 is wound; a terminal portion 25, placed on a base end of the wound portion 24, on which a plurality of terminal pins (not shown) are integrally disposed; a detection holder 26 extended from the tip of the wound portion 24 in a radial direction of the wound portion 24; and circuit casing 27 as will be described later.

A plurality of slits (not shown) are formed on the main body 22 so as to removably attach an insulating substrate 29 onto a base end of the detection holder 26. The detection holder 26 is so constructed and arranged as to position a temperature sensitive resistor 31 at a center of the intake air pipe 2 via the insulating substrate 29. The detection holder 26 is attached with a protection cover in a rectangular shape (not shown).

The circuit casing 27 is disposed on an outer periphery so as to enclose an attaching hole 2A penetrated through the wall of the intake air pipe 2. A fitting portion 27A is fitted into the attaching hole 2A of the intake air pipe 2. Circuit elements such as a flow quantity adjusting resistor 38, differential amplifier, and so forth are actually mounted on the circuit casing 27 as will be described later and built therein. In FIG. 1, reference numerals 28A and 28B are terminals to each of which the winding of the reference resistor 23 is connected.

The insulating substrate 29 is attached onto the detection holder 26. The insulating substrate 29 is formed in a rectangular plate form having a length of about 15 mm to 20 mm and a width of about 3 to 7 mm. The insulating substrate 29 has the base end as a fixed end to which a slot of the detection holder 26 is removably secured and has the tip as a free end.

As shown in FIG. 2, the insulating substrate 29 includes: a main substrate portion 29A, positioned at the tip of the insulating substrate on which a heat generated temperature sensitive main resistor 31, and first and second temperature sensitive resistors 32 and 33 are formed in the film forms; and a sub substrate portion 29B, positioned at the base end of the main substrate portion 29A, attached onto the detection holder 26 so as to spatially separate the temperature sensitive resistor 31 from the detection holder 26, and on which an auxiliary heater 34 is formed in the film form. A slit 30 is formed between the sub substrate portion 29B and main substrate portion 29A in a direction from one side of the insulating substrate 29 to the other side (arrow-marked direction A toward which the intake air mainly flows).

The temperature sensitive main resistor 31 constituting a heat generated resistance and formed on the main substrate portion 29A of the insulating substrate 29 is formed of a platinum film on the main substrate portion 29A using a printing technique or sputtering technique so as to have a resistance value of RH. The temperature sensitive main resistor 31 includes an intermediate resistance portion 31A positioned at the intermediate portion in the elongated direction of the main substrate portion 29A and extended in the width direction and first and second extension resistor portions 31B and 31C mutually extended in the elongated direction of the intermediate resistance portion 29A from both ends of the intermediate resistance portion 31A; and first and second extension resistance portions 31B and 31C extended mutually opposite directions in the elongated direction of the main substrate portion 29A.

The intermediate resistance portion 31A and the extension resistance portions 31A and 31C are integrally formed in the crank shape as a whole. The heat generated temperature sensitive main resistor 31 and the first and second temperature sensitive resistors 32 and 33 are compactly formed. In addition, a surface area (a mounting area) of the heat generated temperature sensitive main resistor is increased as large as possible. For example, a contacting area flowing into the intake air pipe 2 can be enlarged.

In addition, a current value flowing through the heat generated temperature sensitive main resistor 31 is controlled by means of a current control transistor 44, as will be described later. Thus, the temperature of the heat generated temperature sensitive main resistor 31 is maintained at a constant temperature value (for example, about 240° C.).

The first and second temperature sensitive resistors 32 and 33 are formed on the main substrate portion 29A together with the heat generated temperature sensitive main resistor 31 and of temperature sensitive materials such as a platinum on the insulating substrate by means of the printing technique or sputtering technique, the first and second temperature sensitive resistors 32 and 33 having resistance values of RT1 and RT2, respectively. The first and second temperature sensitive resistors 32 and 33 are disposed at a forward position of the heat generated temperature sensitive main resistor 31 and at a rearward position thereof with respect to the flow direction (width direction of the main substrate portion 29A) of the intake air flowing in the arrow-marked direction A, for example, within the intake air pipe 2 spatially apart each other.

As appreciated from FIG. 2, the first temperature sensitive resistor 32 is positioned between the intermediate resistance portion 31A of the heat generated temperature sensitive main resistor 31 and first extension resistance portion 31B thereof and formed in the rectangular form so as to be extended in parallel to the first extension resistance portion 31B. The second temperature sensitive resistor 33 is positioned between the intermediate resistance portion 31A and the second extension resistance portion 31C and formed in the rectangular form so as to be extended in parallel to the extension resistance portion 31C. These first and second temperature sensitive resistors 32 and 33 are formed in the rectangular forms so as to have mutually approximately equal areas on the main substrate portion 29A. During the normal operation, a sub power supply VS supplies the current as shown in FIG. 3 through both temperature sensitive resistors 32 and 33 so as to be heated at lower temperatures than the heat generated temperature sensitive main resistor 31. Thus, the temperature sensitive resistors 32 and 33 are effectively cooled and, thus, the air stream flowing direction can accurately be detected as decreases in the resistance values thereof.

Furthermore, the first temperature sensitive resistor 32 is positioned at the upstream side with respect to the forward direction of the intake air (arrow marked A direction), the second temperature sensitive resistor 33 is positioned at the downstream side with respect thereto, and the heat generated temperature sensitive main resistor 31 is positioned between the first and second temperature sensitive resistor 31. Thus, in the case where the intake air indicates the forward direction (arrow marked A direction), the first temperature sensitive resistor 32 is more cooled but the second temperature sensitive resistor 33 receives the heated air from the heat generated temperature sensitive main resistor 31. Therefore, although the resistance value RT1 of the first temperature sensitive resistor 32 becomes reduced, the resistance value RT2 of the second temperature sensitive resistor. 33 is not substantially varied.

On the other hand, in a case where the intake air flow through the intake air pipe 2 indicates the opposite direction (arrow marked B direction), the second temperature sensitive resistor 33 is cooled but the first temperature sensitive resistor 32 receives the heat from the heat generated temperature sensitive resistor 31. Therefore, in this case, the resistance value RT1 of the first temperature sensitive resistor 32 is not substantially varied with the resistance value RT2 of the second temperature sensitive resistor 33 reduced.

Consequently, the comparison between the resistance values of RT1 and RT2 of both first and second temperature sensitive resistors 32 and 33 permits the determination of whether the intake air flow direction is forward (A) or rearward (B).

The auxiliary heater 34, referring to FIG. 2, is positioned on the sub substrate portion 29B of the insulating substrate 29 and is formed in the film form so as to have the resistance value of RHS made of such a temperature sensitive material such as the platinum by means of the printing technique or sputtering technique as in the same ways as the first and second temperature sensitive resistors 32 and 33. In addition, the auxiliary heater 34 serves to heat the sub substrate portion 29B of the insulating substrate 29, thus preventing the heat generated from the main substrate portion 29A (heat generated temperature sensitive main resistor 31) from being escaped into the detection holder 26 via the sub substrate portion 29B. Furthermore, it is noted that since the slit 30 is formed between the main and sub substrate portions 29A and 29B, the slit 30 can serve to prevent the heat generated from the auxiliary heater 34 from being transmitted to the first temperature sensitive resistor 32 so that the first temperature sensitive resistor 32 is thermally generated only according to the current supply from the sub power supply VS. On the other hand, the auxiliary heater 34, as shown in FIG. 3, is connected between an emitter of the current controlling transistor 44 and the ground so that its current flowing through the heater 34 is controlled according to the current control by means of the transistor 44.

Referring back to FIG. 2, a plurality (for example, 6) of electrodes 35, 35, 35, ...) are formed on the base end of the insulating substrate 29, each electrode 35 being aligned at a predetermined interval of space in the width direction of the insulating substrate 29. The base end side of the insulating substrate is inserted into the slot of the detection holder 26 so as to be connected to each terminal (not shown) of the detection holder 26. Thus, the heat generated temperature sensitive main resistor 31, the first and second temperature sensitive resistors 32 and 33, and auxiliary heater 34, these being formed on the insulating substrate 29, are electrically connected to electronic parts installed in the circuit casing 27 via the respective electrodes 35 so as to constitute a processing circuitry for the detection of the flow quantity as shown in FIG. 3.

Next, the processing circuitry for the flow quantity in the first embodiment will be described with reference to FIG. 3.

A first bridge circuit (a variation form of a Wheatstone bridge) 36 includes four arms having the heat generated main resistor 31, the temperature compensating resistor 37, the reference resistor 23, and a flow quantity adjusting resistor 38 having the resistance value R2, so that a product of the resistance values on two arms opposing each other is equal. A junction a between the heat generated resistor 31 and the temperature compensating resistor 37 is connected to the emitter of the transistor 44 and to one end of the auxiliary heater 34. A junction b between the reference resistor 23 and the flow quantity adjusting resistor 38 is connected to the ground.

The heat generated temperature sensitive main resistor 31 and the reference resistor 23 are connected in series with each other, as shown in FIG. 3. In addition, the temperature compensating resistor 37 and the flow adjusting resistor 38 are connected in series with each other. A junction c between the resistors RH and R1 is connected to, for example, an inverting input end of a differential amplifier 39 and a junction d between the resistors RK and R2 is connected to a non-inverting input end of the differential amplifier 39. In addition, the junction c is also connected to an inverting amplifier 45 (the gain thereof is set to 1) and a selector 46.

It is noted that the temperature compensating resistor 37 is positioned adjacent to the heat generated temperature sensitive resistor 31 and installed in the detection holder 26, does not receive the influence from the intake air stream, and has the resistance value RK varied only according to a temperature of the intake air.

When the first bridge circuit 36 is in a balanced state (equilibrium state), the output voltage of the differential amplifier 39 is set to be zero and voltages across the reference resistor 23 is supplied to the inverting amplifier 45 and the selector 46.

On the other hand, when the first bridge circuit 36 is in an imbalanced state (not in the equilibrium state), namely, when the heat generated temperature sensitive main resistor 31 is cooled due to the intake air, the resistance value RH of the heat generated temperature sensitive main resistor 31 becomes reduced. Thus, the differential amplifier 39 provides a positive current output signal for a base of the transistor 44. The transistor 44 controls the current flowing through the first bridge circuit 36 so that the cooled heated generated temperature sensitive main resistor 31 provides the constant temperature, thus returning the first bridge circuit 36 to the balanced state. At this time, the increased current value output from the junction c is detected as the terminal voltage across the reference resistor 23, this terminal voltage being supplied to the inverting amplifier 45 and selector 46.

A second bridge circuit 40 (a variation in the Wheastone bridge) includes four arms having the first and second temperature sensitive resistors 32 and 33 and reference resistors 41 and 42. The resistance values of respective mutually opposing arms are set to be equal. A junction e between the first and second temperature sensitive resistors 32 and 33, is connected to the sub power supply VS (for example, 3 volts) and a junction f between the reference resistors 41 and 42 is connected to the ground.

In the second bridge circuit 40, the first temperature sensitive resistor 32 and the reference resistor 41 are connected in series with each other. The second temperature sensitive resistor 33 and reference resistor 42 are connected in series with each other. Thus, the first and second temperature sensitive resistors 32 and 33 are connected in parallel to each other.

When the second bridge circuit 40 is in the balanced state, namely, no intake air flows, an output voltage of a comparator 43 gives zero since no difference in resistance values of both first and second temperature sensitive resistors 32 and 33 is present. However, when the second bridge circuit 40 is not in the balanced state, namely, either of the resistance values of the first or second temperature sensitive resistor 32 or 33 is varied due to the air stream occurrence, the difference in the resistance values (RT1–RT2) is input to the comparator 43 as the voltage from the two junctions g and h. A signal indicating the direction of the intake air stream (air stream direction determination signal) is output on the basis, of the difference in the resistance values to the selector 46.

A relationship between the air stream of the intake air and stream direction determination signal is shown in FIG. 4A and FIG. 4B.

When thee intake air stream direction is A (forward direction), the comparator 43 outputs a predetermined voltage V0 as the air stream direction determined signal. When the air stream direction is changed from the forward direction A to the opposite direction B, the comparator 43 outputs a zero-voltage as the air stream direction determined signal.

Referring back to FIG. 3, the transistor 44 has a collector connected to a first power supply VB, namely, a vehicular battery, its base connected to the output end of the differential amplifier 39, and its emitter connected to the junction a of the first bridge circuit 36 and auxiliary heater 34. The transistor 44 controls the emitter current according to the base current which is varied according to the output current controlling signal from the differential amplifier 39. Thus, the current value flowing through the first bridge circuit 36 so as to maintain the temperature on the heat generated temperature sensitive main resistor 31. This is a feedback control circuit.

The inverting amplifier 45 is connected between the junction c and selector 46 and serves to invert the flow quantity indicative signal from the first bridge circuit 36 and supply the inverted flow quantity indicative signal to the selector 46.

The selector 46 generally includes a switching circuit with a drive terminal connected to the comparator 43. That is to say, the selector 46 outputs the flow quantity determination signal from the first bridge circuit 36 as an output signal $V_{out}$ via an output terminal thereof 47 to a control unit (not shown) when the comparator outputs the predetermined voltage V0 (refer to FIG. 4B), i.e., when the air stream direction determined signal indicates the forward direction (A) of the air stream. When the air stream direction determined signal indicates the opposite direction (rearward B direction), the selector 45 outputs the output signal of the inverting amplifier 45 as the output signal $V_{out}$ via the output terminal 47 to the control unit (not shown).

The control unit generally includes a microcomputer, as disclosed in the U.S. Pat. No. 5,343,745 issued on Sep. 6, 1994 (the disclosure of which is herein incorporated by reference).

The airflow quantity detection operation will herein be described in the first embodiment.

When the intake air stream is directed in the forward, i.e., the arrow marked A direction, the first temperature sensitive resistor 32 positioned at the upstream side of the insulating substrate 29 is cooled due to the air stream but the second temperature sensitive resistor 33 positioned at the downstream of the first temperature sensitive resistor 32 receives heated air from the heat generated temperature sensitive main resistor 31. Consequently, the second bridge circuit 40 becomes imbalance and the comparator 43 outputs the predetermined voltage V0 as the air stream direction determined signal.

In addition, since the heat generated resistor 31 is cooled due to the intake air stream occurrence and the cooling causes the resistance value RH of the heat generated temperature sensitive resistor 31 to be reduced. However, since the current value flowing through the first bridge circuit 36 is increased so as to maintain the heat generated temperature sensitive main resistor 31 at the constant temperature, the increased current value being detected as the terminal voltage across the reference resistor 23. Consequently, the positive intake airflow quantity detection signal is output from the first bridge circuit 36 to the inverting amplifier 45 and selector 46. It is noted that the positive airflow quantity detection signal input to the inverting amplifier 45 is output to the selector 46 as the inverted negative airflow quantity detection signal.

The selector 46 selects one of the positive airflow quantity detection signal from the first bridge circuit 36 or the negative airflow quantity detection signal from the inverting amplifier 45 on the basis of the air stream direction determined signal from the comparator 43. In this case, since the stream direction determined signal is forward (A), the selector 46 selects the positive airflow detection signal and outputs it via the output terminal 47 toward the control unit as the output signal $V_{out}$.

Since the base current flowing into the base of the transistor 44 is controlled on the basis of the output signal from the differential amplifier 39, the feedback control is carried out to maintain the heat generated temperature sensitive main resistor 31 at the constant temperature.

On the other hand, in the case where the air stream direction is opposite (direction B) to the forward direction, the second temperature sensitive resistor 33 positioned at the downstream side of the insulating substrate 29 is, in turn, cooled due to the air stream occurrence but the first temperature sensitive resistor 32 receives heat from the heat generated temperature sensitive main resistor 31. Consequently, since the second bridge circuit 40 becomes imbalance, the comparator 43 outputs the zero voltage as the air stream direction determined signal to the selector 46.

As described above, since the heat generated temperature sensitive main resistor 31 is cooled due to the reversed intake air stream, the resistance value RH of the heat generated temperature sensitive main resistor 31 is once decreased and the first bridge circuit 36 becomes imbalance. Consequently, the first bridge circuit 36 outputs the positive flow quantity detection signal to the selector 46 and outputs the negative flow quantity detection signal to the selector via the inverting amplifier 45 to the selector 46. The selector 46 selects one of the positive or negative flow quantity indicative signal, in this case, selects the negative flow quantity indicative signal on the basis of the opposite air stream direction determined signal from the comparator 43 and outputs it to the control unit as the output signal $V_{out}$.

The control unit can detect the accurate intake air flow quantity on the basis of the output signal $V_{out}$ and can carry out the accurate air-fuel mixture ratio control, thus the engine performance being improved.

In the hot-film type airflow quantity detecting apparatus 21 in the first embodiment, the heat generated temperature sensitive resistor 31 is formed on the insulating substrate 29 and the first and second temperature sensitive resistors 32 and 33 are formed at the forward and rearward positions of the heat generated temperature sensitive main resistor 31 so as to enable the detection of the air stream direction of the intake air and the variation in the resistance value of the heat generated temperature sensitive resistor 31 can be used to detect the intake airflow quantity. Thus, the intake air quantity and its air stream direction can be accurately detected.

In addition, since the heat generated temperature sensitive main resistor 31 formed on the insulating substrate 29 is constituted by the intermediate resistance portion 31A and first and second extension resistance portions 31C and 31C extended mutually along the elongated directions mutually opposite to each other. Then, since the first and second temperature sensitive resistors 32 and 33 are formed in the film forms on the insulating substrate 29 in parallel to the first and second extension resistance portions 31C and 31C, the heat generated temperature sensitive resistor 31 and first and second temperature sensitive resistors 32 and 33 can compactly be formed utilizing a limited surface space of the insulating substrate and a surface area (mounting area) of the heat generated temperature sensitive main resistor 31 becomes wider as wide as possible. Then, since contact areas of the heat generated temperature sensitive main resistor 31 and the first and second temperature sensitive resistors 32 and 33 against the air stream within the intake air pipe 2 can be enlarged and these resistance values of RH, RT1, and RT2 can more sensitively be varied to the air stream. The plurality of resistors 31, 32, and 33 are formed in the single insulating substrate 29. The number of parts can be reduced.

Furthermore, since the auxiliary heater 34 is formed on the sub substrate portion 29B of the insulating substrate 29 and serves to heat the sub substrate portion 29B of the insulating substrate. 29, the auxiliary heater 34 can assist in heating the insulating substrate 29 through the heat generated temperature sensitive main resistor 31. This can prevent the heat on the main substrate portion 29A from being transmitted into the airflow meter main body 22 via the sub substrate portion 29B. Consequently, the time (so called, a heat up time) required to raise the temperature of the heat generated temperature sensitive main resistor 31 to the constant temperature described above during the engine start can be extremely shortened.

Since the slit 30 is formed between the main substrate portion 29A and sub substrate portion 29B of the insulating substrate 29 and the slit 30 is formed so that the heat on the auxiliary heater 34 does not give an influence on the first temperature sensitive resistor 32, the thermal influence of the auxiliary heater 34 on the first temperature sensitive resistor 32 can effectively be prevented. The second bridge circuit 40 can accurately detect or determine the air stream direction of the intake air.

Since the sub power supply VS serves to heat the first and second temperature sensitive resistors 32 and 33, the cooling of the first and second temperature sensitive resistors can accurately be detected due to the occurrence in the air flow stream and the direction of the air stream can accurately and sensitively be determined.

In the case where the air flow of the intake air is the forward direction (direction of A), the first temperature sensitive resistor 32 positioned at the upstream side of the insulating substrate 29 is cooled according to the air stream flow and the second temperature sensitive resistor 33 positioned at the upstream side receives the heat from the heat generated resistor 31. Consequently, the second bridge circuit 40 becomes imbalanced and the forward stream direction determined signal having the predetermined voltage value V0 is output from the comparator 43.

The selector 46 selects one of either the positive flow quantity detection signal or the negative flow quantity detection signal from the bridge circuit 36 on the basis of the stream direction determined signal from the comparator 43. In this case, since the stream direction determined signal is forward, the positive flow quantity determined signal is selected and the positive flow quantity signal is output to the control unit as the output signal $V_{out}$ via the output terminal 47.

It is noted that since the base current from the transistor 44 is controlled on the basis of the output signal from the differential amplifier 39, the feedback control to make the heat generated temperature sensitive resistor 31 at the constant temperature.

On the other hand, in the case where the air stream flow is in the opposite direction (direction B), the second temperature sensitive main resistor 33 positioned at the downstream side of the insulating substrate 29 is cooled and the first temperature sensitive resistor 32 positioned at the upstream side receives heat from the heat generated temperature sensitive resistor 31. Consequently, the second bridge circuit 40 becomes imbalanced and the airflow direction determined signal indicating the opposite direction (B) to the normal forward direction (A) is output whose voltage value gives zero from the comparator 43.

Second Embodiment

Figure 5:
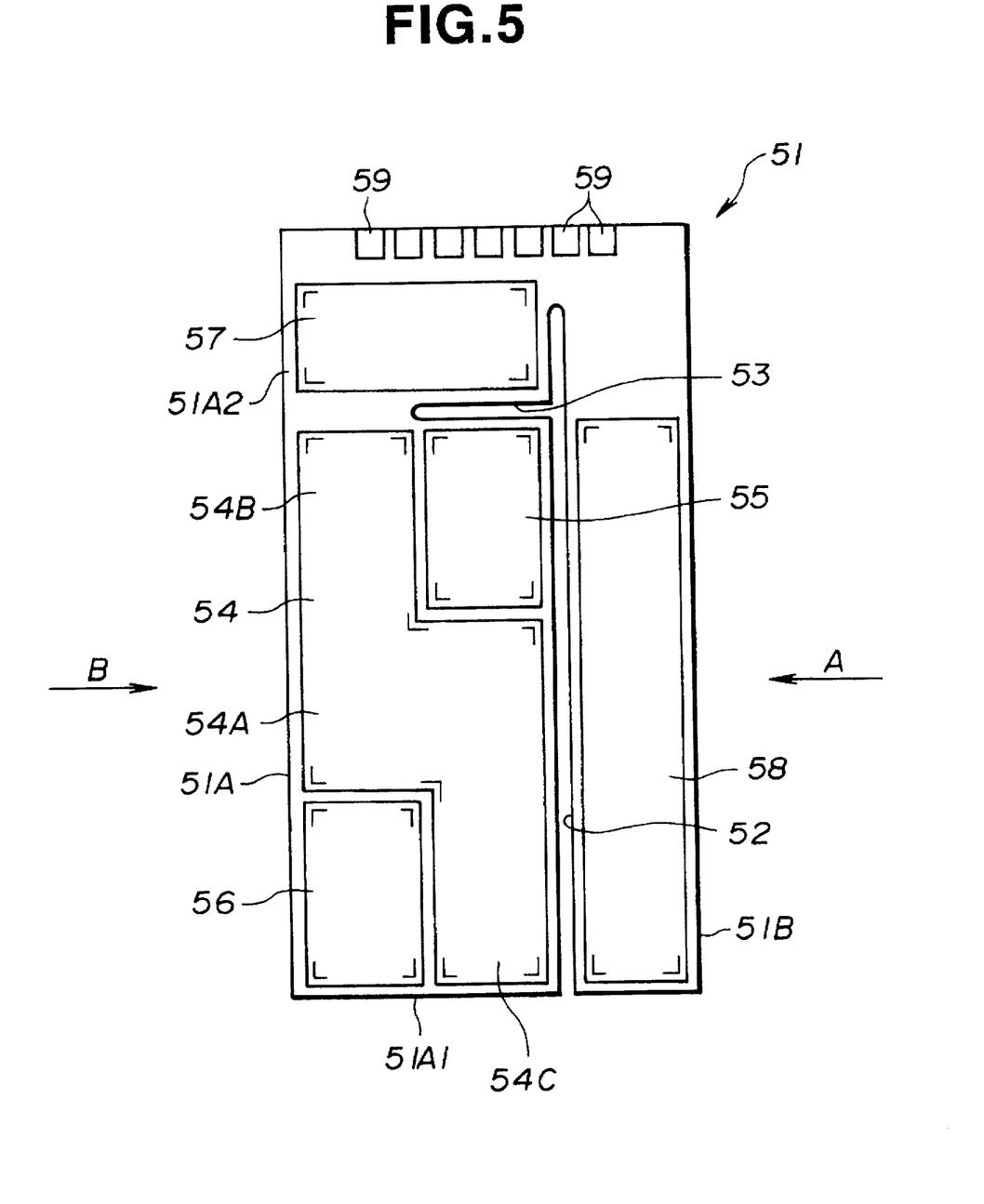
FIG. 5 is a detailed plan view of a heat generating resistor body, first and second temperature sensitive resistors, and auxiliary heater formed on an insulating substrate in a case of a second preferred embodiment according to the present invention.
Figure 6:
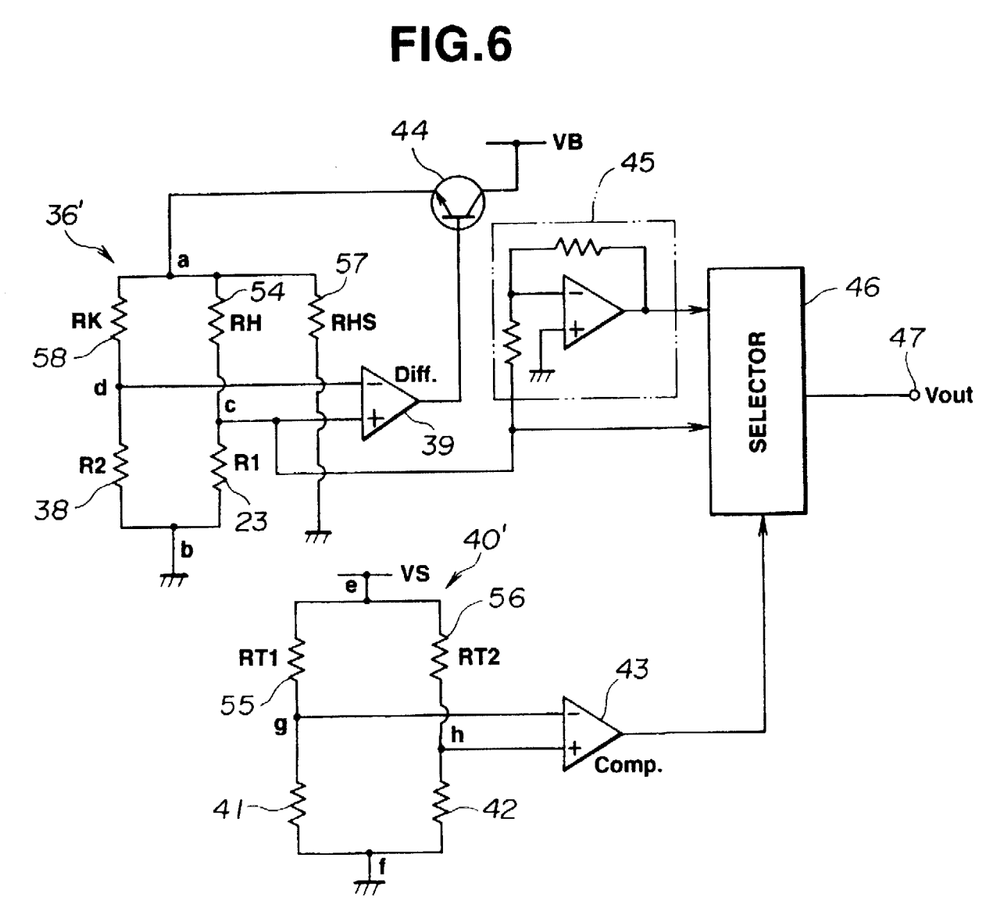
FIG. 6 is a circuit block diagram of the hot-film type air quantity detecting apparatus in the second embodiment.

Next, FIGS. 5 and 6 show a second preferred embodiment of the airflow quantity detecting apparatus.

The feature of the first preferred embodiment is that the heat generated temperature sensitive resistors, first and second temperature sensitive resistors, auxiliary heater, and temperature compensating resistor are formed in the film forms on the single insulating substrate. It is noted that since the same reference numerals as in the first embodiment designate corresponding elements and their explanations are omitted herein.

The insulating substrate 51 is formed of an insulating substrate such as a glass, alumina, and aluminum nitride in the elongated (rectangular) plate form, includes first and second substrate portions 51A and 51B, and has the base end attached onto the detection holder 26 and its tip a free end. A first slit 52 is formed between the first and second substrate portions 51A and 51B and extended from the base end of the insulating substrate 51 to the free end thereof. It is noted that the second substrate portion 51B is positioned at the more upstream side than the first substrate portion 51A with respect to the forward direction (arrow marked direction A) and a temperature compensating resistor 58 (as will be described later) is formed on the second substrate portion 51B.

The first substrate portion 51A includes: the main substrate portion 51A1 formed in the rectangular shape having its tip being the free end; and the sub substrate portion 51A2 positioned at the base end of the main substrate portion 51A1 and attached onto the detection holder 26. A second slit 53 is formed which communicates with the first slit 52 in the direction from one side of the width direction of the whole insulating substrate to the other side (arrow marked direction A). It is noted that both first slit 52 and second slit 53 are not always communicated with each other as shown in FIG. 5.

The heat generated main resistor 54 is formed on the main substrate portion. 51A1 of the insulating substrate 51 in the form of the film form made of such a temperature sensitive material as the platinum so as to have the resistance value RH by means of the printing technique or sputtering technique. In the same way as the first embodiment, the heat generated main resistor 54 includes the intermediate resistance portion 54A and first and second extension resistance portions 54B and 54C extended (mutually opposing) in the elongated direction of the insulating substrate 51 from both sides of the intermediate resistance portion 54A In the same way as the heat generated temperature sensitive main resistor 31, the current value is controlled by means of the transistor 44 described in the case of the first embodiment and maintained at the constant temperature (for example, about 240° C.).

The first and second temperature sensitive resistors 55 and 56 are formed in the film forms made of such the temperature sensitive material as the platinum so as to have resistance values RT1 and RT2 by means of the printing technique and sputtering technique. In addition, the first temperature sensitive resistor 55 is positioned between the first extension resistance portion 54B and intermediate resistance portion 54A and formed in parallel to the extension resistance portion 54B. The second temperature sensitive resistance portion 56 is positioned between the second extension resistance portion 54C and intermediate resistance portion 54A and formed in parallel to the second extension resistance portion 54C. The first temperature sensitive resistance portion 55 is positioned at the up stream side with respect to the forward direction of the intake air (arrow marked direction of A) and the second temperature sensitive resistor 56 is positioned at the downstream side.

The auxiliary heater 57 is positioned on the sub substrate portion 51A2 of the insulating substrate 51 and is formed in the film form made of the temperature sensitive material such as the platinum in the same way as the first and second temperature sensitive resistors 55 and 56 by means of the printing technique or sputtering technique so as to have the resistance value of RHS. The auxiliary heater 57 serves to heat the sub substrate portion 51A2 of the insulating substrate 51, thereby preventing the heat from the main substrate portion 51A1 (heat generated main resistor 54) via the detection holder 26 from being transmitted to the detection holder 26. A slit 53 is formed between the main substrate portion 51A1 and the sub substrate portion 51A2 so as to prevent the first temperature sensitive resistor 55 from being heated from the auxiliary heater 57.

The temperature compensating resistor 58 is formed on the second substrate portion 51B and is formed in the film form made of the platinum using the printing technique and sputtering technique. The temperature compensating resistor 58 is provided with the large resistance value RK than the heat generated main resistor 54, does not receive the influence from the intake air stream, and detects only the temperature variation.

The plurality of electrodes 59 (for example, seven) are formed on the base end of the insulating substrate 51 and are aligned at the predetermined interval of distance in the width direction of the insulating substrate 51. The base end of the insulating substrate 51 is inserted into the slot of the detection holder 26, thereby each terminal (not shown) being connected to the corresponding one of the electrodes.

In the way described above, since the insulating substrate 51 is attached onto the airflow meter main body 22 described in the second embodiment, the signal processing circuitry constituted by the first bridge circuit 36' and second bridge circuit 40' is formed so as to detect the airflow quantity and determine the air stream direction as described in the first embodiment shown in FIG. 6.

The hot-film airflow quantity detecting apparatus in the second embodiment can detect the air stream direction of the intake air in the same way as the first embodiment.

That is to say, when the intake air causes the heat generated temperature sensitive main resistor 54 on the insulating substrate 51 to be cooled and outputs the flow quantity determined signal to the bridge circuit 30' with the resistance value of the heat generated temperature sensitive main resistor 54 decreased and outputs the negative flow quantity determined signal to the selector 46 from the inverting amplifier 45.

On the other hand, the second bridge circuit 40' serves to determine whether the direction toward which the intake air stream is forward (A) or rearward (B) depending on the difference in the resistance values between the first and second temperature sensitive resistors 55 and 56. The intake air stream direction determined signal 46 outputs the intake air stream direction determines signal to the selector 46 via the comparator 43. This output signal to the selector 46 causes the selector 46 to select the positive or negative airflow quantity detected signal on the basis of the air stream direction determined signal from the second bridge circuit 40' (comparator 43). The selector 46 outputs the selected intake air quantity indicative (detected) signal to the control unit as the output signal $V_{out}$. Consequently, the accurate air-fuel mixture ratio control can be carried out by the control unit on the basis of the intake air quantity detected with its air stream direction.

Since, in the second embodiment, the heat generated temperature sensitive main resistors 54, the first and second temperature sensitive resistors 55 and 56, auxiliary heater 57, and temperature compensating resistor 58 are formed in the film forms on the single insulating substrate 51, the number of parts on the insulating substrate can be reduced rather than the first embodiment.

Furthermore, the first slit 52 is formed between the second substrate portion 51B on which the temperature compensating resistor 58 is formed in the film form and the first substrate portion 51A on which the heat generated temperature sensitive main resistor 54, first and second temperature sensitive resistors 55 and 56, and auxiliary heater 57 are formed in the film forms, for example, the heat transmission from the first substrate portion 51A on which the heat is generated from the heat generated temperature sensitive main resistor 54 to the second substrate portion 51B can be prevented. In addition, the temperature rise in the first substrate portion 51A can become earlier and the time it takes to shorten the heat up time duration.

Since the second slit 53 is formed on the first substrate portion 51A and is positioned between the sub substrate portion 51A2 on which the auxiliary heater 57 is formed in the film form and the main substrate portion 51A1 on which the heat generated temperature sensitive main resistor 54 and the first and second temperature sensitive resistors 55 and 58 are formed, for example, the heat transmission from the main substrate portion 51A1 on which the heat is generated from the heat generated temperature sensitive main resistor 54 to the sub substrate portion 51A2 can be prevented. The temperature rise in the main substrate portion 51A1 can become earlier.

On the other hand, since the second slit 53 is formed and positioned between the first temperature sensitive resistor 55 and auxiliary heater 57, the thermal influence from the auxiliary heater 57 on the first temperature sensitive resistor 55 can effectively be prevented. The air stream direction of the intake air can accurately be detected by means of the first bridge circuit 40'.

It is noted that although in each embodiment the first temperature sensitive resistor 32 (55) is located at the upstream side with respect to the intake air stream flowing direction and the second temperature sensitive resistor 33 (56) is located at the downstream side with respect thereto, the first temperature sensitive resistor 32 (55) may be positioned at the upstream side and the second temperature sensitive resistor 33 (56) may be positioned at the upstream side. In this case, the selector 46 may receive an inverted air stream direction determined signal to the comparator 43.

In addition, although in each embodiment the reference resistor 23 which is wound on the winding portion 24 of the intake airflow meter main body 22 may be projected within the intake air pipe 2, the reference resistor 23 may be disposed within the circuit casing 27 (which is installed on the outer periphery of the intake air pipe 2) together with the airflow quantity adjusting resistor 38.

Furthermore, although in each embodiment the first bridge circuit 36 (36') outputting the intake air quantity detected signal are formed of the heat generated temperature sensitive main resistor 31(54), temperature compensating resistor 37 (temperature compensating resistor 58), the reference resistor 23 and intake airflow quantity adjusting resistor 38, the first bridge circuit 36 (36') may be formed of the resistance value fixed temperature compensating resistor 37 (temperature compensating resistor 58) and the resistance value fixed intake airflow quantity resistor 38.

Various types of embodiments and modifications can be made within the scope of the present invention which will be defined by the appended claims.

What is claimed is:

1. An apparatus comprising:
   a) an airflow meter main body having a base end and a free end, said base end being attached onto an inner surface of an intake air pipe of a vehicular internal combustion engine;
   b) a temperature sensitive main resistor which undergoes a heat generation by means of a first external power supply, said temperature sensitive main resistor having a resistance value that varies according to a temperature of the temperature sensitive main resistor, and which is so constructed and arranged so as to be exposed to an intake air flowing in the intake air pipe;
   c) an insulating substrate attached onto the airflow meter main body, said temperature sensitive main resistor being formed and secured on said insulating substrate in a film form and being extended along at least an elongated direction of said insulating substrate; and
   d) first and second temperature sensitive resistors which are formed on surface portions of said insulating substrate other than portions on which said temperature sensitive main resistor is formed, said first and second temperature sensitive resistors having corresponding resistance values which vary according to respective temperatures of said first and second temperature sensitive resistors, and being spaced apart from each other in an upper stream and a downstream direction, respectively, with respect to a main air stream direction of the intake air flowing into each cylinder of the engine, said first and second temperature sensitive resistors being heated to mutually equal temperatures by means of a second external voltage supply.

2. An apparatus as claimed in claim 1, wherein said temperature sensitive main resistor is generally formed in a crank shape, having an intermediate resistance portion placed on an intermediate portion of the insulating substrate in the elongated direction and having first and second extension resistance portions extended along the elongated direction of the insulating substrate in mutually opposite directions, and wherein said first temperature sensitive resistor is positioned between the first extension resistance portion and the intermediate resistance portion and formed in parallel to the first extension resistance portion and said second temperature sensitive resistor is positioned between the second extension resistance portion and the intermediate resistance portion and formed in parallel to the second extension resistance portion.

3. An apparatus as claimed in claim 2, wherein said insulating substrate is generally formed in a rectangular shape, said insulating substrate comprising:
   a main substrate portion having a tip which corresponds to the free end and on which said temperature sensitive main resistor and said first and second temperature sensitive resistors are formed in the film forms and secured;
   a sub substrate portion positioned at the base end of said main substrate portion and attached onto the airflow meter main body so as to spatially separate said temperature sensitive main resistor from the airflow meter main body; and
   at least one slit, positioned between the main and sub substrate portions and extended from one side in a width direction of said insulating substrate to another side therein so as to suppress a heat transmission from the temperature sensitive main resistor to the sub substrate portion.

4. An apparatus as claimed in claim 2, which further comprises an auxiliary heater disposed on said sub substrate portion so as to heat said sub substrate portion.

5. An apparatus as claimed in claim 2, wherein said insulating substrate includes first and second substrate portions having base ends fixed to the airflow meter main body and tips being free ends, a first slit extending from the tips to the base ends between said first and second substrate portions and wherein a temperature compensating resistor is formed in the film form and secured on the second substrate portion, said first substrate portion having: a main substrate portion having the tip being free end and on which the temperature sensitive main resistor and said first and second temperature sensitive resistors are formed in the film form and secured; a sub substrate portion positioned at the base end of said main substrate portion and disposed on the airflow meter main body so as to spatially separate the temperature sensitive resistor from the airflow meter main body; and a second slit extended from one side thereof in the width direction of the first substrate portion to the other side thereof so as to suppress the heat transmission from said temperature sensitive main resistor to the sub substrate portion.

6. An apparatus as claimed in claim 5, which further comprises an auxiliary heater disposed on the sub substrate portion so as to heat the sub substrate portion.

7. An apparatus as claimed in claim 1, wherein said first and second temperature sensitive resistors are electrically connected in parallel to each other so as to constitute airflow direction determining means, said airflow direction determining means comparing the resistance values of both said first and second temperature sensitive resistors and outputting an airflow direction indicative signal according to the determined airflow direction.

8. An apparatus as claimed in claim 7, which further comprises: a bridge circuit including said temperature sensitive main resistor at one side thereof and being formed so as to take out a variation in the resistance value of the temperature sensitive main resistor in the bridge circuit as a airflow quantity indicative signal; and selector means for directly outputting said airflow quantity indicative signal when the airflow direction determined signal output from the airflow direction determining means indicates a forward direction and for inverting said airflow quantity indicative signal and for outputting the inverted airflow quantity signal when said airflow direction determined signal output from said airflow direction determining means indicates a direction opposite to the forward direction.

9. An apparatus for an internal combustion engine, comprising:
   a) an airflow meter main body having a base end and a free end, said base end being attached onto an inner surface of and intake air pipe of the engine;
   b) a temperature sensitive main resistor which generates heat according to a voltage supplied by a first external power supply, said temperature sensitive main resistor having a resistance value which varies according to a temperature in a body thereof, which is so constructed and arranged as to be exposed to an intake air flowing in the intake air pipe, and which constitutes a first circuit for measuring an air flow quantity in the intake air pipe;

c) an insulating substrate attached to the airflow meter main body, said temperature sensitive main resistor being formed and secured on said insulating substrate in a film form and being extended along at least an elongate direction of said insulating substrate; and d) first and second temperature sensitive resistors which are formed on surface portions of said insulating substrate other than portions on which said temperature sensitive main resistor is formed, said first and second temperature sensitive resistors having corresponding resistance values which vary according to temperatures in their respective bodies, said first and second temperature sensitive resistors being spaced apart from each other in upstream and downstream directions with each cylinder of the engine, said first and second temperature sensitive resistors comprising means for determining a stream direction of the intake air in the intake air pipe, said first and second temperature sensitive resistors being heated to mutually equal temperatures by means of a second external power supply so that the resistance value of either said first or second temperature sensitive resistor is varied according to the stream direction of the intake air.

10. An apparatus as claimed in claim 9, wherein said temperature sensitive main resistor is generally formed in a crank shape, having an intermediate resistance portion placed on an intermediate portion of the insulating substrate in the elongate direction and having first and second extension resistance portions extended along the elongate direction of the insulating substrate in mutually opposite directions, and wherein said first temperature sensitive resistor is positioned between the first extension resistance portion and the intermediate resistance portion and in parallel to the first extension resistance portion and said second temperature sensitive resistor is positioned between the second extension resistance portion and the intermediate resistance portion and in parallel to the second extension resistance portion.

11. An apparatus as claimed in claim 10, wherein said insulating substrate is generally formed in a rectangular shape, said insulating substrate comprising:

a main substrate portion having a tip which corresponds to the free end and on which said temperature sensitive main resistor and said first and second temperature sensitive resistor and said first and second temperature sensitive resistors are formed in the film forms and secured;

a sub substrate portion positioned at the base end of said main substrate portion and attached onto the airflow meter main body so as to spatially separate said temperature sensitive main resistor from the airflow meter main body; and at least one slit, positioned between the main and sub substrate portions and extended from one side in a width direction of said insulating substrate to an other side therein so as to suppress a heat transmission from the temperature sensitive main resistor to the sub substrate portion.

12. An apparatus as claimed in claim 11, which further comprises an auxiliary heater disposed on said sub substrate portion so as to heat said sub substrate portion.

13. An apparatus as claimed in claim 10, wherein said insulating substrate includes first and second substrate portions having base ends fixed to the airflow meter main body and tips to the base ends between said first and second substrate portions and wherein a temperature compensating resistor is formed in the film form and secured on the second substrate portion, said first substrate portion comprising:

a main substrate portion having the tip being a free end and on which the temperature sensitive main resistor and said first and second temperature sensitive resistors are formed in the film form and secured;

a sub substrate portion positioned at the base end of said main substrate portion and disposed on the airflow meter main body so as to spatially separate the temperature sensitive resistor from the airflow meter main body; and a slit extended from one side of the first substrate portion in a width direction of the first substrate portion to the other side of the first substrate portion so as to suppress the heat transmission from said temperature sensitive main resistor to the sub substrate portion.

14. An apparatus as claimed in claim 13, wherein said airflow meter main body comprises:

a wire wound portion on which a reference resistor having a reference resistance is wound;

a terminal portion attached to a base end of the wire wound portion, said terminal portion having a plurality of terminal pins integrally disposed thereon;

a detection holder extending from a tip end of the wire wound portion in a radial direction with respect to the wire wound portion, said detection holder being arranged to position the temperature sensitive main resistor at a substantially center point with respect to the intake air pipe; and a circuit casing for enclosing an attaching hole that penetrates through a wall of the intake air pipe.

15. An apparatus as claimed in claim 14, wherein the airflow meter main body includes a plurality of slits so as to removably attach the insulating substrate onto a base end of the detection holder.

16. An apparatus as claimed in claim 1, wherein when the intake air is flowing in a forward direction from the upstream direction to the downstream direction, the first temperature sensitive resistor is cooled more than the second temperature sensitive resistor, due to the second temperature sensitive resistor receiving heated air from the temperature sensitive main resistor, and wherein when the intake air is flowing in a reverse direction from the downstream direction to the upstream direction, the second temperature sensitive resistor is cooled more than the first temperature sensitive resistor, due to the first temperature sensitive resistor receiving the heated air from the temperature sensitive main resistor.

\* \* \* \* \*